H. E. MANOFSKY.
SANDING MACHINE.
APPLICATION FILED FEB. 10, 1917.

1,286,697.

Patented Dec. 3, 1918.
8 SHEETS—SHEET 1.

Witnesses:

Inventor
Herman E. Manofsky

H. E. MANOFSKY.
SANDING MACHINE.
APPLICATION FILED FEB. 10, 1917.

1,286,697.

Patented Dec. 3, 1918.
8 SHEETS—SHEET 2.

Witnesses:
Arthur W. Carlson
Robert H. Weir

Inventor
Herman E. Manofsky
By Hiero &hie Attys.

H. E. MANOFSKY.
SANDING MACHINE.
APPLICATION FILED FEB. 10, 1917.

1,286,697.

Patented Dec. 3, 1918.
8 SHEETS—SHEET 6.

H. E. MANOFSKY.
SANDING MACHINE.
APPLICATION FILED FEB. 10, 1917.

1,286,697.

Patented Dec. 3, 1918.
8 SHEETS—SHEET 7.

Witnesses:

Inventor
Herman E. Manofsky
By Hill & Hill
Attys.

H. E. MANOFSKY.
SANDING MACHINE.
APPLICATION FILED FEB. 10, 1917.
1,286,697.
Patented Dec. 3, 1918.
8 SHEETS—SHEET 8.
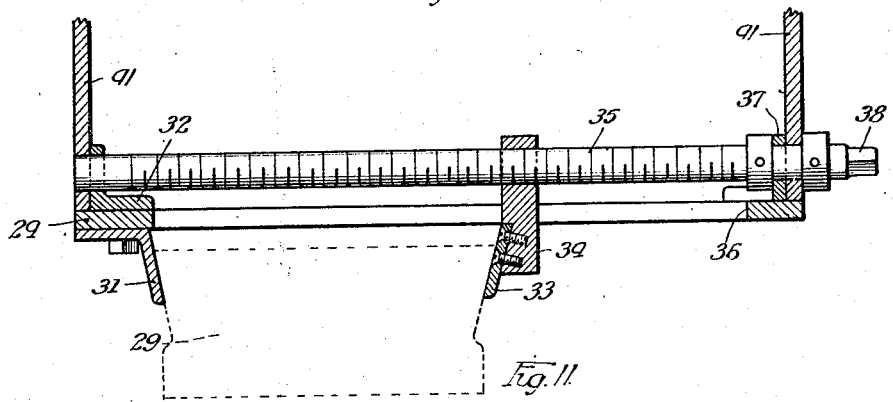
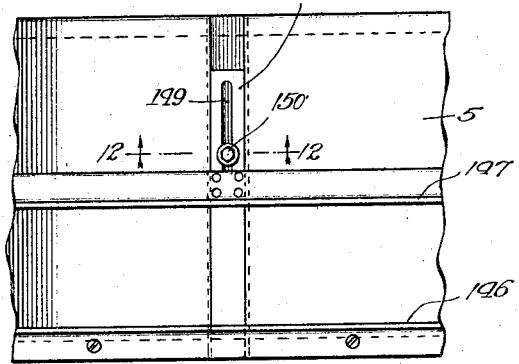
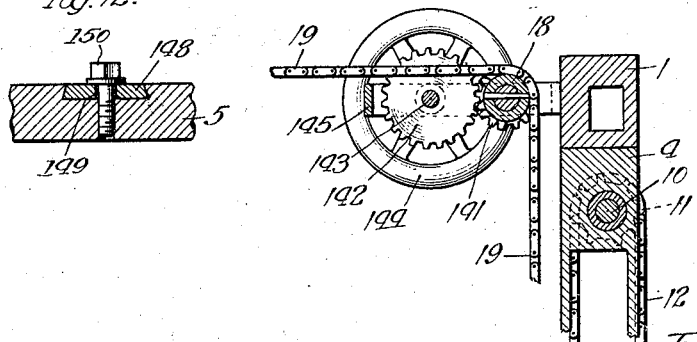
Witnesses:
Inventor
Herman E. Manofsky
By Hill & Hill
Attys.

UNITED STATES PATENT OFFICE.

HERMAN E. MANOFSKY, OF CHICAGO, ILLINOIS, ASSIGNOR OF ONE-FIFTH TO WILLIAM A. KLATTE, ONE-FIFTH TO WILLIAM C. STAUDE, ONE-FIFTH TO HENRY D. BOCKMANN, AND ONE-FIFTH TO EMIL MANOFSKY, ALL OF CHICAGO, ILLINOIS.

SANDING-MACHINE.

1,286,697.     Specification of Letters Patent.     Patented Dec. 3, 1918.

Application filed February 10, 1917. Serial No. 147,884.

*To all whom it may concern:*

Be it known that I, HERMAN E. MANOFSKY, a citizen of the United States, residing at Chicago, in the county of Cook and State of Illinois, have invented certain new and useful Improvements in Sanding-Machines, of which the following is a description.

My invention belongs to that general class of devices known as sanding machines, and more especially relates to a machine that will sandpaper or finish moldings, flooring, woodwork and lumber for other purposes. The invention has among its objects the production of a device of the kind described that is exceedingly simple, efficient, convenient, durable, and satisfactory, that may be used wherever found applicable. It has particularly as an object the production of a machine that may be operated continuously for comparatively long periods, without necessitating the stopping of the machine for the renewing of the sandpaper or other abrasive material, and in which the work can be fed through continuously with each piece finished exactly similar to the preceding one. It also has as an object the production of a machine which may be easily equipped and adjusted for different kinds of work, shapes and material, and which will do the work satisfactorily and without cutting any of the sharp edges of the molding or other work. It also has as an object the production of a machine that may be used in conjunction with a planer or sticker, receiving the work directly therefrom and finishing it without additional handling. This is of considerable importance in itself, as with our machine the same may run continuously between regular stopping times without requiring the adjustment or application of new sandpaper and stopping of the sticker or planer, while the sandpaper is being renewed in the sanding machine. Many other objects and advantages, as well as novel features, will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts, Figure 1 is a top plan view of the machine;

Fig. 10 is a sectional view taken substantially on line 10—10 of Fig. 4;

Fig. 11 is an enlarged top plan view of a portion of the bed 5, illustrating one of the side guides for the work;

Fig. 12 is a sectional view taken substantially on line 12—12 of Fig. 11, and

Fig. 13 is a sectional view taken substantially on line 13—13 of Fig. 4.

Figure 1:
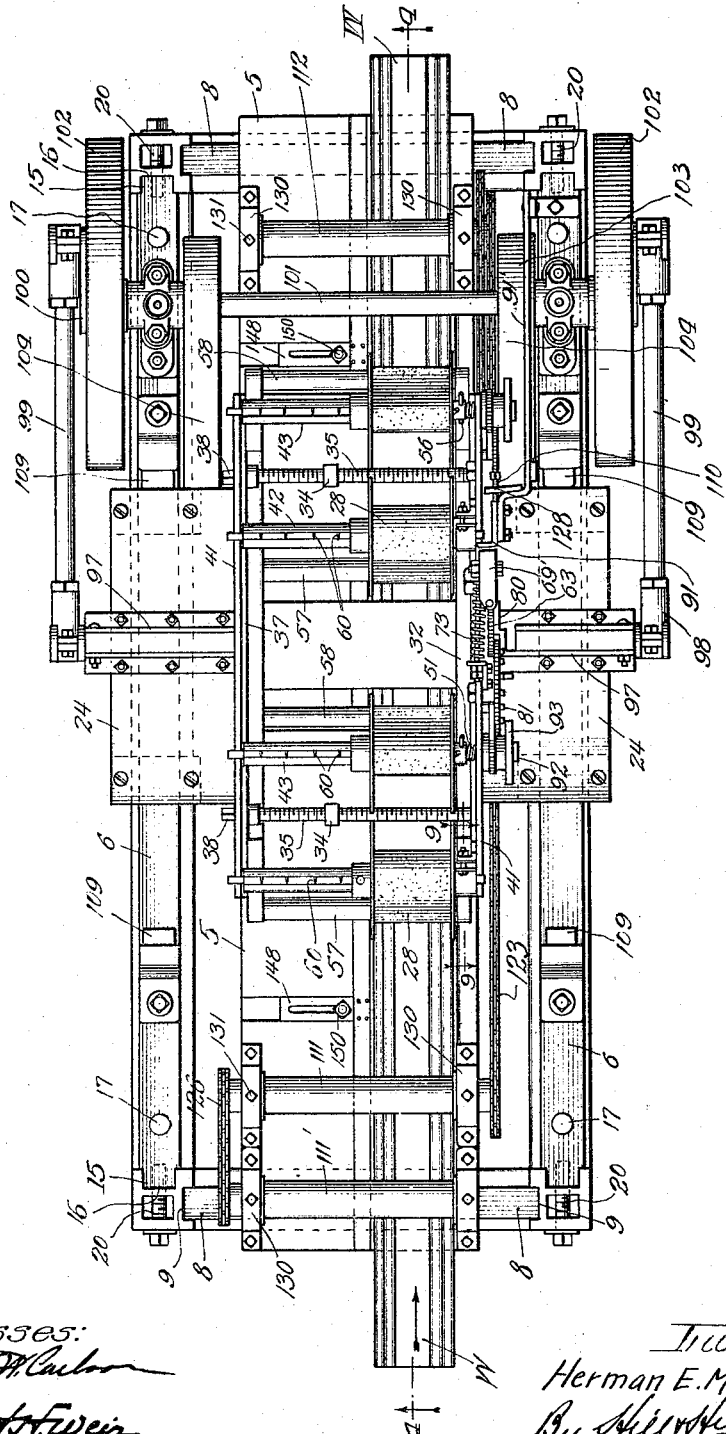

Referring to the drawings, in which the preferred form of my device is shown, a main frame consisting of the posts 1, preferably arranged one at each corner, and having connecting parts 2 at the bottom, and 3 and 4 at the sides and ends respectively, the desired distance from the base of the corner posts are provided. The main frame carries a table or bed 5, the same being preferably adjustably supported in any desired manner from the frame of the machine, so that the same may be raised or lowered, or adjusted as may be found desirable. I also preferably provide guides 6 at the sides of the frame, arranged above the table and extending from end to end, the purpose of these being more fully explained hereafter. As shown, the table 5 is preferably stiffened or braced by the ribs 7 arranged on the lower side, and the same provided with cross-bars 8, arranged at each end, which are adapted to engage in the grooves or guides 9 in the corner posts of the frame, and prevent movement of the table except its vertical raising or lowering. The table or bed 5 in the construction shown is adjustably carried by the screw-threaded members or bolts 10, which extend through the end or cross members 4 and engage with the cross pieces 8, upon which the table is supported. The members 10 may be turned in any suitable manner to vary the adjustment of the bed or table 5, a very convenient and simple construction consisting of the sprocket wheels 11 arranged one on each member 10, the same being connected by the sprocket chain 12. Obviously, this permits all of the members 10 to be turned at the same time or in unison, so that the bed or table 5 is uniformly raised or lowered, and is maintained substantially level at all times.

Figure 3:
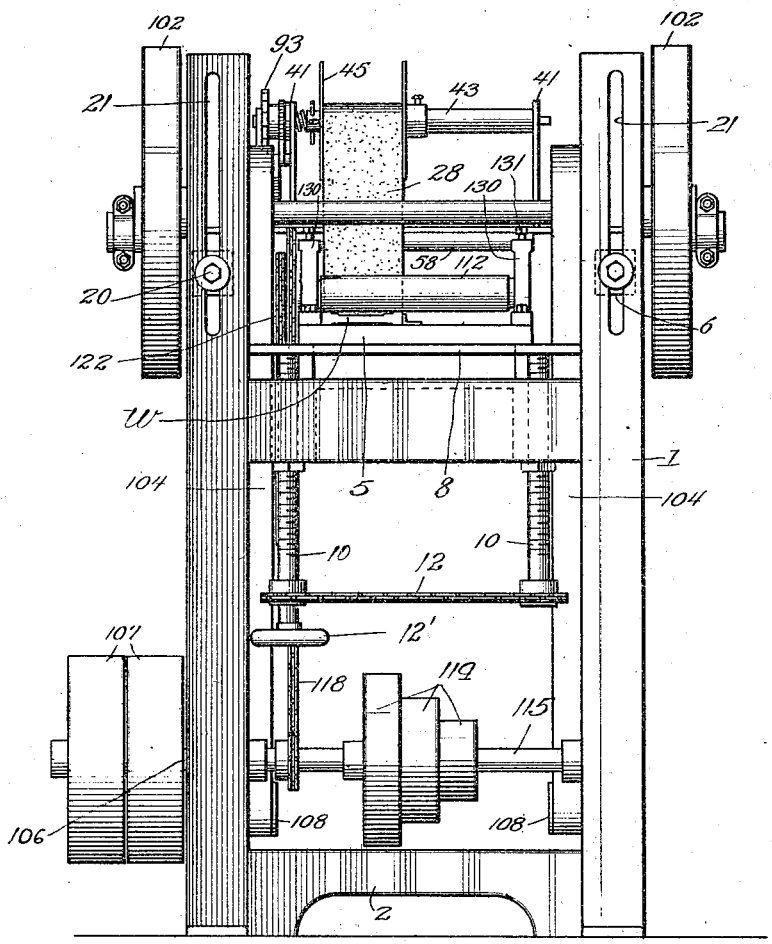
Fig. 3 is an end elevation of the same.

The guides 6 are arranged at their ends 15 to engage in grooves 16 in the end posts 1, the same being preferably supported and maintained in the desired position by the screw-threaded members or bolts 17, which afford adjustable supports so that the two guides may be raised or lowered or maintained in the desired adjustments. In this case I preferably provide sprockets 18, or their equivalents, on the bolts 17, and simultaneously control all of the bolts by a sprocket chain 19, or its equivalent. I also prefer to provide additional means for locking the guides in the desired position, and have shown the bolts 20 for the purpose. When the bolts 20 are tightened down the guides 6 are to all intents and purposes a part of the main frame, and consequently extremely rigid and unyielding. As most clearly shown in Fig. 3, the corner posts 1 are slotted as at 21, so as to allow the adjustments and permit the guides to be supported and locked at any desired point above the bed or table 5.

Carried by the guides 6 is a reciprocating carriage 24, the same being slidably secured on the guides by the clamping members 25 and 26, the construction being such that the carriage may be easily removed from the guides without removing the guides from the machine. The reciprocating carriage 24 carries one or more, as shown two, sanding blocks. Inasmuch as these sanding blocks are ordinarily made alike, and are so shown, a description of one, and its method of securing the same to the carriage, will be sufficient. The sanding block is arranged to carry the sandpaper 28, and maintain the same in contact with the work W. In the preferred construction the sanding block preferably consists of a face plate or member part 27, which is secured to a body member 29 in any desired manner, as for example by screws and bolts, or the equivalent, a cushion or cushioning pad 30, preferably of rubber, being generally placed between the face part plate 27 and the body part 29. It may be mentioned that the operative face of the face plate 27 is preferably constructed to conform to the woodwork to be sanded, that is, it is substantially the reverse, as most clearly illustrated in Fig. 5. The sandpaper is extended, however, with its sanded face against the work between the face plate 27 and the work W, the method of securing the paper in place and feeding the same across the sanding block to renew the same being more fully described hereinafter.

Figure 4:
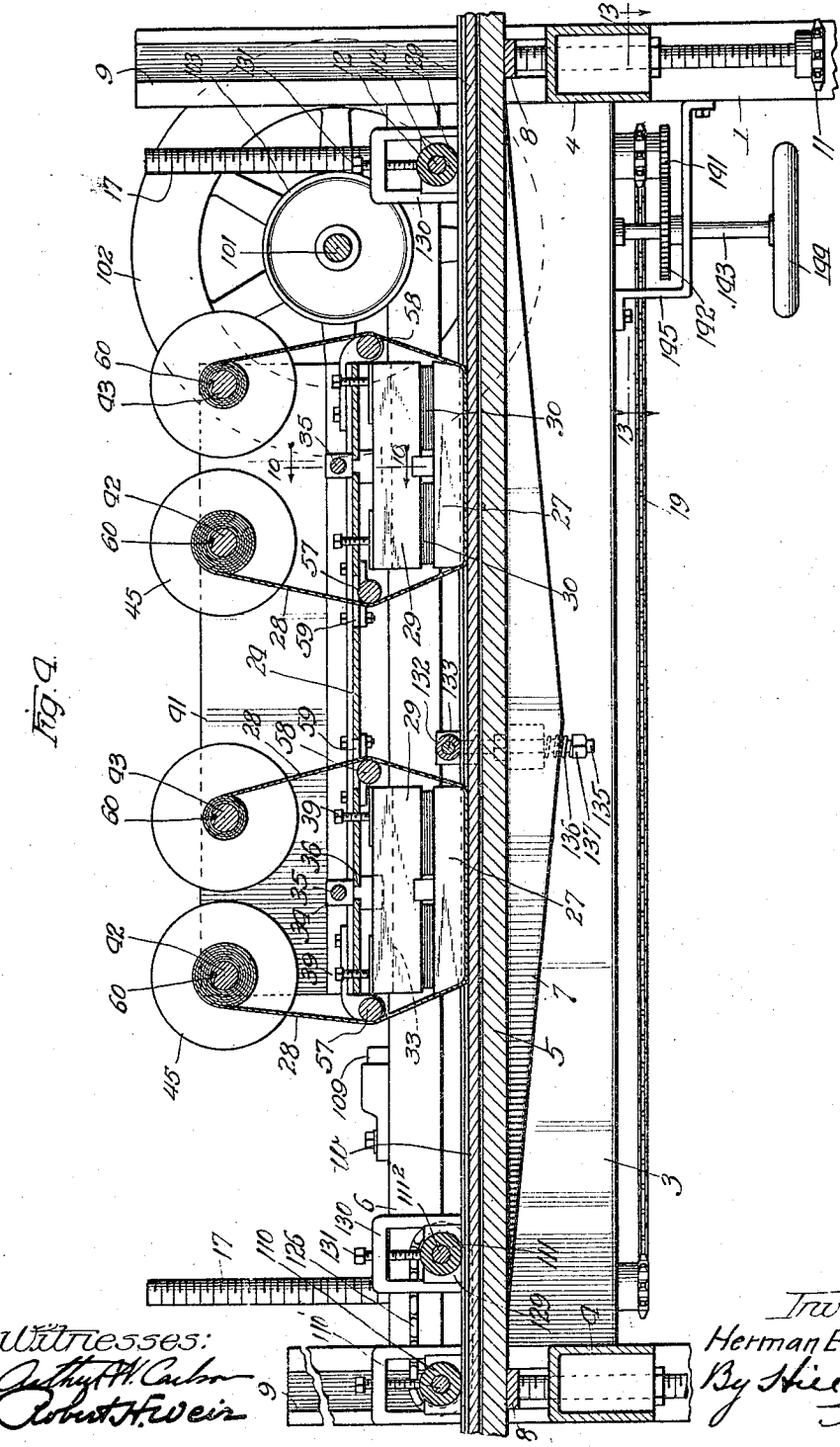
Fig. 4 is a sectional view taken substantially on line 4—4 of Fig. 1.
Figure 8:
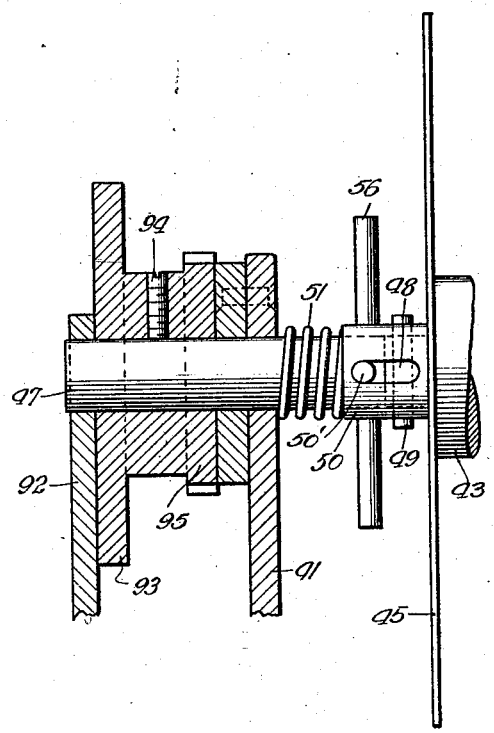
Fig. 8 is a sectional view taken substantially on line 8—8 of Fig. 6.
Figure 9:
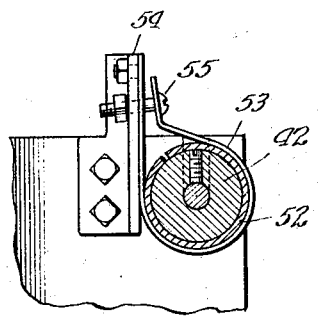
Fig. 9 is a sectional view taken substantially on line 9—9 of Fig. 1.

The sanding block, consisting of the parts mentioned, may be suitably secured to the reciprocating carriage 24 in any desired manner. As the work may vary in width, however, I provide a simple construction for holding the sanding block in place so that various sizes may be carried and the same be easily and quickly interchanged. As most clearly shown in Figs. 4, 5, and 10, the carriage 24 is provided with a member 31, which may be rigidly secured to the carriage, and which also adjustably carries a coöperating member 33. The member 33 is secured to a member 34, which is arranged on a threaded shaft 35, the shaft being rotatable, and the construction being such that rotation of the shaft in one direction or the other will move the flange 33 toward or away from flange 31. As shown (see Fig. 4) the part 34 is provided with a neck that extends through the slot 36 in the table. The shaft 35 is rotatably carried by the angles or flange members 32 and 37. The shaft 35 may be rotated in any suitable manner, as for example by a wrench (not shown) formed to engage the squared end 38 on the shaft 35, and inasmuch as the shaft can only rotate and not move endwise, and obviously rotation of the shaft causes part 34 to be moved similarly to a nut on a bolt, the nut being prevented from rotating, but being free to move lengthwise the bolt. As most clearly shown in Fig. 4, I also employ the bolts 39, which are arranged to engage the top of the block 29, and maintain the same in the desired adjustment. The carriage 24 is provided with extending walls 41 (see Figs. 4 and 5), which carry rolls 42 and 43. The roll 42 may be termed the supply roll, and roll 43 the receiving roll, there being a pair of rolls for each sanding block carried on the machine, the machine shown being equipped with two sanding blocks and two pairs of rolls. The rolls 42 and 43 are provided with flanges 44 and 45. Flanges 44 are shown secured to the roll by set screws 46. It may be mentioned that rolls 43 are arranged to be driven, while rolls 42 are provided with means tending to retard the rotation, their rotation being caused by the drawing of the paper therefrom. The flanges 45 on rolls 42 may be secured to the shafts carrying the roll. Flanges 45 on rolls 43, however, are preferably secured in place, as most clearly shown in Fig. 8, in which shaft 47 rotates the shaft or rod carrying the roll. In this case the end 48 of the roll and shaft 47 extends into a collar 50, which is provided with a slot, through which projects pin 50'. 49 is a pin. 56 is a pin, by means of which shaft 47 may be turned. A spring 51 normally maintains the collar and flanges 45 tightly against the end of the roll 43. The brakes or retarding mechanism for the rolls 42 is shown in detail in Fig. 9, in which 52 is a band, preferably of leather, and 53 is a brake strap band, which is secured to a bracket 54 at one end and adjustably secured to the bracket at the other end by a bolt 55, or its equivalent.

At each end of each sanding block, I provide a roller 57 and 58, the carriage being slotted at 59 so that the sandpaper 28 may be secured to roll 42, extending over roll 57 under the sanding block base plate 27, thence over roll 58, through the slot 59 and to roll 43. The sandpaper ends may, of course, be secured to the rolls 42 and 43 in any suitable manner, pins 60 being shown for the purpose.

Figure 6:
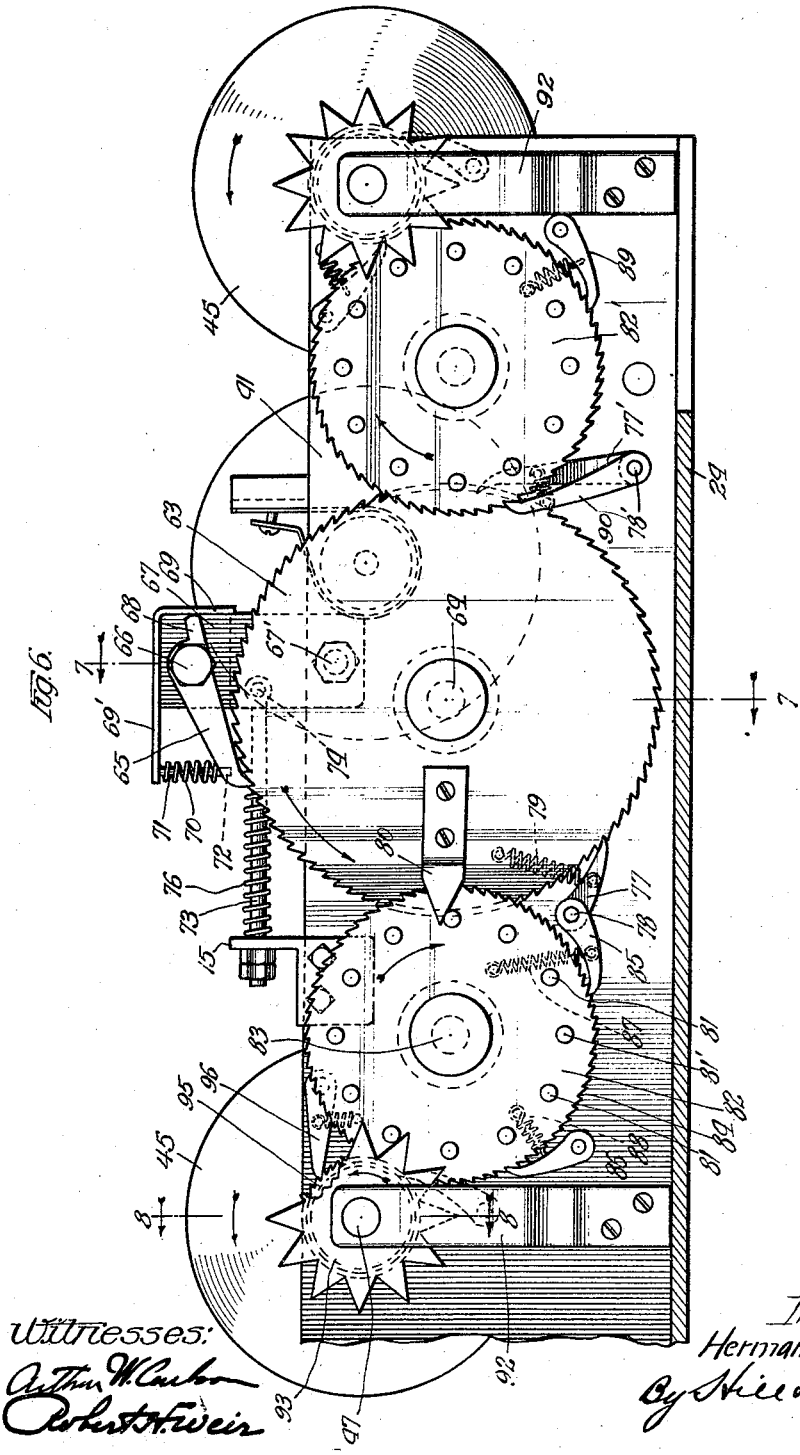
Fig. 6 is an enlarged view of a portion of the sandpaper feeding mechanism shown in Fig. 2.
Figure 7:
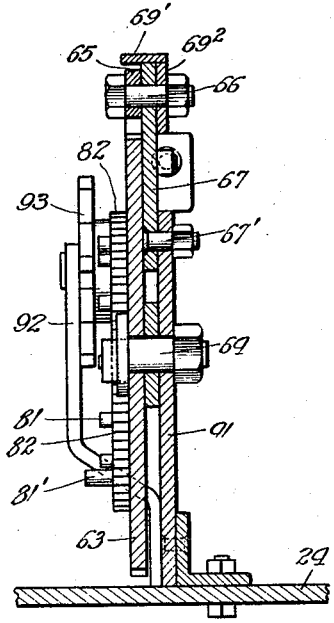
Fig. 7 is a sectional view taken substantially on line 7—7 of Fig. 6.

As was before mentioned, 42 is the supply roll and 43 the receiving roll, 43 being positively driven. A full roll of sandpaper is arranged on roll 43, with the other end secured to roll 42, the same extending under the sanding block as described. The rolls 43 may be actuated in any desired manner to cause the paper to be fed from one roll to the other, the preferred arrangement being such, however, that the paper is moved from one to the other in a series of steps, as the carriage carrying the same was reciprocated. My improved mechanism for actuating the rolls 43 is shown most clearly in Figs. 6 and 7. Referring to these figures, 63 is a ratchet wheel, or its equivalent, which is rotatably mounted on a shaft 64 carried by one of the side members 41 of the carriage. The wheel 63 is rotated by means of a pawl 65, which is pivotally carried at 66 by a bracket 67, pivotally secured at 67', to the member 41. The pawl 65 is provided with an extending end 68, which contacts with the flange 69 on bracket 67, 69' being a flange extending over the pawl, between which end and the pawl is arranged a spring 70. The spring 70 is maintained in place by the pins 71 and 72 respectively. Obviously, the spring 70 tends to maintain the pawl 65 in engagement with the teeth on the ratchet wheel 63. The bracket 67 is connected by a rod 73, which is pivotally secured thereto at 74 to a bracket 75. Upon the rod 73 is arranged a spring 76. The spring 76 tends to oppose the pivotal movement of the bracket 67 about its pivot 67', the rod 73 sliding in the bracket 75. The ratchet wheel 63 carries a member 80, which is arranged to actuate what may be termed a pin wheel 82. Two pin wheels 82 and 82' are shown (one for each receiving roll). Inasmuch as they are substantially identical a description of one will suffice for both. The pin wheel 82 is rotatably mounted on a shaft or support 83, and is provided with a plurality of pins 81 projecting from the face, one or more of which, as shown one, 81', is slightly longer than the others. The pin wheel is prevented from rotating backward by means of one or more pawls 85—86, which are maintained in engagement with the teeth 84 on the wheel by springs 87 and 88, or their equivalents. I have shown the pin wheel 82' maintained against backward rotation by the pawls 89 and 90. Arranged to coöperate with the pin 81' is a star wheel, as it may be termed, 93, (one for each receiving roll), which is suitably secured to shaft 47, the outer end of which is carried by the bracket 92. The star wheel is prevented from rotating in a reverse direction than that indicated by the arrow in Fig. 6 by one or more pawls 96, arranged to engage the ratchet wheel 95, secured to or forming a part of the star wheel 93'. The operation of the pawl 65 will be hereafter explained.

The carriage 24 is provided with projecting shaft ends carried by the extending parts 97, upon which are arranged members 98, which are substantially crank ends on the crank rods 99, which are secured to cranks 100 on shaft 101. Shaft 101 is also provided with a pair of fly wheels 102, and with driving pulleys 103. The pulleys 103 are driven by means of belts 104, extending over the pulleys 105 secured to shaft 106. In the preferred construction, I employ two driving pulleys 103, and belts 104, and pulleys 105. Shaft 106 is driven by one of the pulleys 107, a loose pulley being shown of the usual construction. I have also shown adjustable belt tighteners and guides, consisting of the pulleys 108, which may be adjusted to allow for the adjustment of shaft 101 when the guides 6 are raised or lowered, shaft 101 being carried in bearing parts or journals mounted on the ends of the guides.

Obviously, as the shaft 101 is rotated, the carriage 24 is reciprocated back and forth on the guides 6. I have provided yielding resilient bumpers 109, preferably arranged as shown. Mounted on a fixed part of the frame is a bumper 91, which is adjustably secured to a part 91', carried by the guide 6 at one side, part 91 being formed to engage with the flange 69 on the bracket 67. The part 91 is secured to part 91' by bolts or their equivalents, one part being slotted so that the same may be adjusted. The parts are maintained against slipping by a bolt 110, which supplements the holding bolts, this extending through a bracket or part 128, carried by the part 91'. Mounted above the table or bed 5, and preferably adjustable relative thereto, are a plurality of feeding rolls, any desired number being employed. For the purpose I have shown rolls 111, 111' and 112. Roll 111 is mounted on shaft 111², roll 111' on a similar shaft, and roll 112 on shaft 112'. Ordinarily the rolls are made with a rubber or equivalent face, that will suitably frictionally engage with the work and feed the same through the machine, without wearing or injury to the work.

Figure 2:
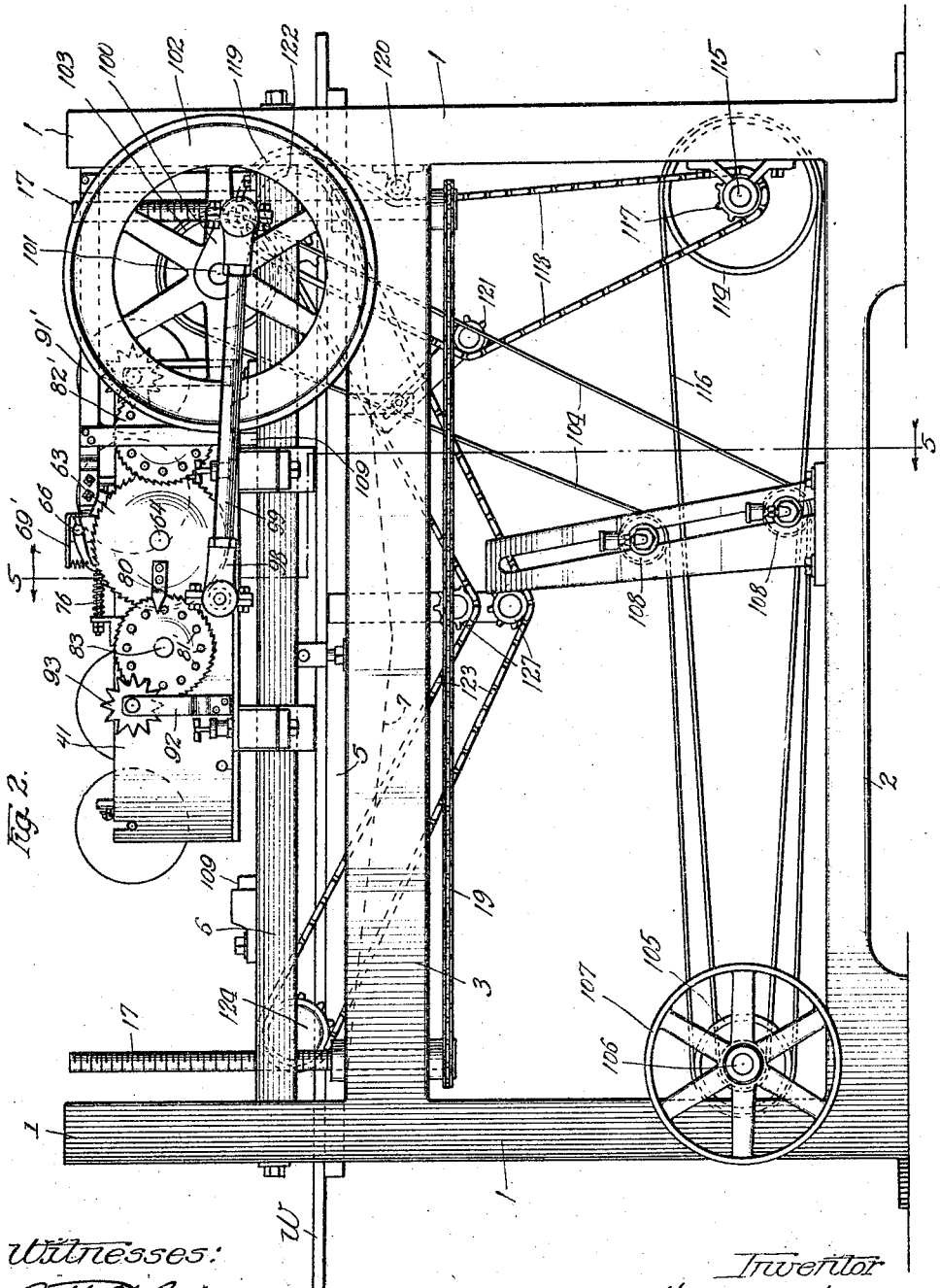
Fig. 2 is a side elevation of the same.
Figure 5:
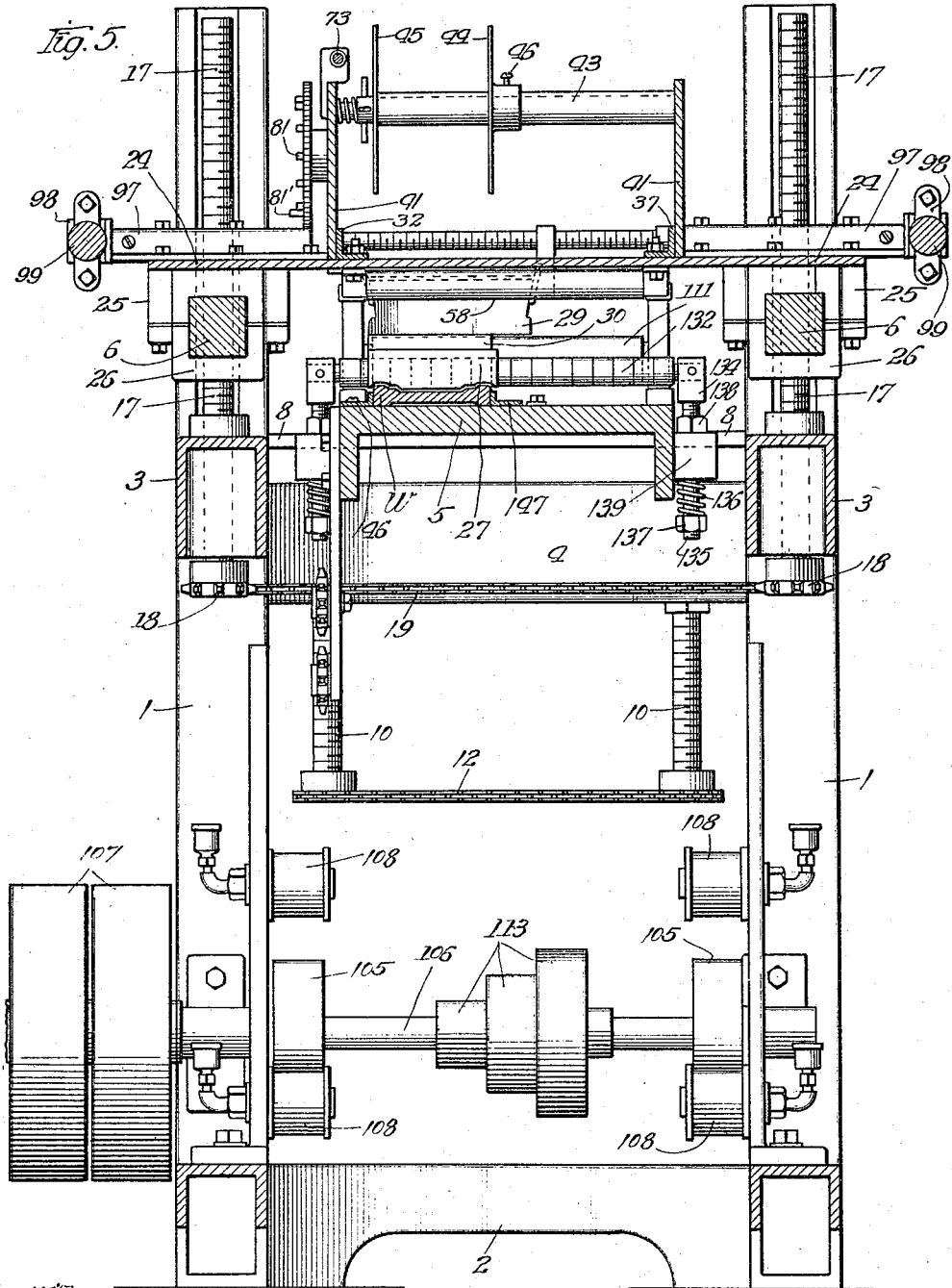
Fig. 5 is a sectional view taken substantially on line 5—5 of Fig. 2.

The feeding rolls are driven in any suitable or desired manner. Referring to Fig. 5, it will be noted that I have provided a pulley 113 on shaft 106, and this is arranged through belt 116 (see Fig. 2) to drive a pulley 114 (see Fig. 3) mounted on the shaft 115. Shaft 115 also carries a sprocket wheel 117, which drives sprocket 119, by means of the sprocket chain 118. The guides and tighteners 120 and 121 are arranged as shown. The sprocket 119 drives the shaft 112', the same being suitably secured thereto. I have shown the other feeding rolls driven by a chain 123, by means of a sprocket 122 on shaft 112', shaft 111² being provided with a sprocket 124. A sprocket chain 126 driven through a sprocket wheel on shaft 111² drives the adjacent feeding roller shaft and roll. Inasmuch as the thickness of the work to be sanded may vary, the feeding roll shafts are preferably adjustably supported so that they may be varied as desired to increase or decrease the pressure as required. As shown, they are mounted in journal boxes 129, which are carried in the frame parts 130, the bolts 131 maintaining the rolls in the desired position. As most clearly shown in Fig. 2, idlers or tighteners 127 may be provided for the sprocket chain 123.

In addition to the feeding rolls mentioned, I also preferably provide a roll 132 (see Figs. 4 and 5) which is mounted on shaft 133, this shaft being mounted in journals 134. The journal members 134 are provided with threaded parts or bolts 135, which extend through the lugs 139, carried by the table. Nuts 138, or their equivalents, limit the downward movement of the roll 132, while the springs 136 bear against the lugs 139, nuts 137 tend to maintain the roll in contact with the work so that it is held firmly against the table as it passes thereover. Obviously, the parts may be adjusted by varying the position of the nuts 137 or 138.

As most clearly shown in Figs. 5, 11 and 12, I provide guides on the bed or table 5 for preventing a lateral sliding of the work. While any suitable construction may be employed, that illustrated is particularly convenient and simple, and, as shown, 146 is a guide which is arranged at one side of the table. This guide is ordinarily permanently secured to the table, as it is unnecessary to adjust the same. It may, however, be made adjustable, similar to the other guide, as will be hereafter mentioned. The other guide 147 is preferably so mounted upon the face of the bed or table 5 so that it may be moved and engage the edge of the work, regardless of whether it is narrower or wider than that shown in the figure mentioned.

In the machine illustrated the guide 147 is mounted on slides 148, which carry the same, and which are dove-tailed or otherwise secured to the bed 5, as indicated in Figs. 11 and 12. The slides 148 are secured in the desired position by the bolts 150, which extend through a slot 149 in each slide.

I have shown (Figs. 4 and 13) a gear 141 arranged on one of the members 17, which gear meshes with the gear 142 secured to shaft 143 carried by a bracket 145, which shaft may be operated by a hand wheel 144, or its equivalent. Obviously, turning the hand wheel will cause the rotation of all of the members 17, thereby raising the various guides, and with them the reciprocating carriage and other mechanism carried by the carriage and guides.

In describing the operation of the device it may be assumed that the parts are adjusted as shown, with the work in the machine. As the shaft 101 is driven by the belts 104 from the driving shaft 106, the carriage is reciprocated back and forth on the guides 6. The feed rolls 111, 111' and 112 are also driven, tending to force the work W in the direction indicated by the arrow on the same in Fig. 4. In the drawings the carriage is shown about to complete its travel in one direction ready to move back in the opposite direction. It moves back and thence again to the position shown, etc. On its return (to the right Fig. 2) however, the part 69 engages with the member 91 (see Fig. 1) just before completing the stroke, moving the pawl in a direction to move the ratchet wheel 63 a step in the direction indicated by the arrow in Fig. 6. The extent of travel of the part 69 and pawl 65 may be regulated by varying the adjustment of the rod 73 or by adjusting the member 91 on its support 91'. As the ratchet wheel is driven it successively engages through the member 80 with the pins 81 and 81', thereby driving the two pin wheels at intervals. As the pin wheels rotate the pins 81' engage with the star wheels and drive them, and these being secured to the shafts 47, the paper receiving rolls 43 are driven at intervals, drawing the sandpaper 28 thereon. Obviously, the sandpaper is in this way renewed, so that it is unnecessary to stop the machine to apply a new paper to the sanding blocks. The several pawls, of course, prevent a backward or reverse rotation of the various wheels, and it will be noted that by adding additional long pins 81' to the pin wheels 82, the rotation of the rolls 43 may be such that the paper is fed faster over the sanding blocks. Likewise, additional cam members 80 may be placed upon the ratchet wheel 63 for the same purpose.

If it is desired to raise or lower the table 5, the wheel 12 may be turned, and this causes the members 10 to be rotated in unison, thereby raising or lowering the table. The guides 6 may be likewise adjusted by turning the hand wheel 144. One of the advantages of making the table 5 adjustable is that it may be brought up or lowered to aline with any style of sticker or planer, so that work may be fed directly therefrom into the sanding machine, and be discharged from the sanding machine, sanded evenly and to the desired extent. Obviously, changing the belt on the cone pulleys 113 and 114, will vary the speed of feeding the work through the machine. By adjusting the pawl 65 and part 69, as set forth, as well as rod 73, or the member 91, the operation of the sandpaper feeding mechanism may be varied. Also the addition of more long pins on the wheels or other adjustments will vary the operation of the same. When it is desired to remove the sanding blocks, shaft 35 may be rotated so that the flange 33 releases the block, and the block lifted out. I have not considered it necessary to illustrate or describe in detail how the face plates 27 may be cut to substantially conform to the molding or other work, as most clearly illustrated in Fig. 5, as this will be understood by any woodworker. Ordinarily they are cut on a band saw, but may, of course, be otherwise constructed. It will be noted that the sanding blocks work substantially similar to the sanding by hand except that the work is sanded uniformly. As a matter of fact each piece comes through the machine finished exactly as the preceding one. When all the paper has been drawn off from the rolls 42 the old paper may be removed from roll 43 and new paper applied to the machine. The rolls of paper, or its equivalent, however, may be of such size that the periods during which the machine will run continuously may be comparatively long.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:—

1. In a sanding machine of the kind described and in combination, a reciprocating sanding block carrier, a vertically adjustable sanding block carried thereby, a strip of sanding material extended over the operative face of said block, and means for carrying the ends of said strip, comprising a pair of rolls mounted on said carrier, and means for operatively actuating one of said rolls to draw the paper over the block and parallel with the direction of travel of the work from one roll to the other, including a ratchet wheel operatively connected with one of said rolls, a pawl arranged to operatively engage said wheel, a rockable support for said pawl, adjustable means for positively operatively engaging said support at predetermined intervals and resilient means for controlling said support.

2. In a sanding machine of the kind described and in combination, a vertically and transversely adjustable reciprocating sanding block, a strip of sanding material extending over the operative face of said block, and movable therewith, and means for carrying the ends of said strip, comprising a pair of rolls, and means for operatively actuating one of said rolls after a predetermined number of reciprocations of said sanding block to draw the paper over the block from one roll to the other, in a series of steps substantially shorter than the length of the sanding block, whereby the abrasive face of the block is partially renewed at certain intervals.

3. In a machine of the kind described and in combination, a suitable frame, a work table carried thereby, a plurality of reciprocating sanding blocks mounted above said table, means for adjusting the parts and varying the distance between the sanding block and table, a strip of sanding material for each block, and means for moving the same over the sanding blocks during the reciprocation thereof, whereby the abrasive faces under the block are periodically completely renewed after predetermined intervals during the operation of the machine, the time required for the renewal of one face being independent of the time required for the renewal of the other face.

4. In a device of the kind described and in combination, a suitable frame, a work-carrying table adjustably carried thereby, a reciprocating carriage mounted thereabove, guides for carrying said carriage, said guides adjustably carried by said frame, a sanding block carried by said carriage, sandpaper extending over the said block, and means for periodically advancing the paper thereover during the reciprocation of the block, and means for reciprocating said carriage.

5. In a device of the kind described and in combination, a suitable frame, a work-carrying table adjustably carried thereby, a reciprocating carriage mounted thereabove, guides for carrying said carriage, said guides adjustably carried by said frame, a sanding block adjustably carried by said carriage, sandpaper extending over the said block, and means for periodically advancing the paper thereover during the reciprocation of the block, consisting of rolls rotatably carried by the carriage, and means carried by the carriage for controlling the operation of said rolls, and means for reciprocating said carriage.

6. In a machine of the kind described, a suitable frame, a work-carrying table carried by said frame, a reciprocating carriage mounted thereabove, means for slidably carrying said carriage, a plurality of sanding blocks carried by said carriage, a paper supply roll and a paper-receiving roll for each block mounted on said carriage, a strip of sandpaper extending from one roll, under the sanding block, and thence to the other, a similar strip for the other block, means common to both sanding blocks for independently rotating said receiving rolls, means for retarding the rotation of the supply rolls, means for feeding the work to be sanded through the machine, means for maintaining the work on said table, means for guiding the same thereover, and means for reciprocating said carriage.

7. In a machine of the kind described, a suitable frame, a work-carrying table adjustably carried by said frame, a reciprocating carriage mounted thereabove, means for slidably carrying said carriage, said means adjustably carried by said frame, a sanding block adjustably carried by said carriage, a paper supply roll and a paper-receiving roll mounted on said carriage, a strip of sandpaper extending from one roll, under said sanding block, and thence to the other adjustable means for rotating said receiving roll in a predetermined manner, means for retarding the rotation of the supply roll, means for frictionally engaging and feeding the work to be sanded through the machine, means for maintaining the work on said table, means for guiding the same thereover, and means adjustable with said carriage carrying means for reciprocating said carriage.

8. In a device of the kind described and in combination, a suitable frame, a work carrier carried by said frame, and vertically adjustable thereon, a reciprocating carriage mounted above said table, means for slidably carrying said carriage, said means adjustably carried by said frame, means for reciprocating said carriage, a pair of sanding blocks adjustably carried by said carriage, each consisting of a body provided with a face plate conforming to the work to be sanded, and cushioning means arranged between said face plate and the first-mentioned body part, a roll arranged at each end of each sanding block, a paper supply roll, and a paper-receiving roll mounted on said carriage above each of said sanding blocks, the paper from each of said supply rolls extending over the roll at one end of its respective block, thence under the face plate, thence over the other roll, and to its receiving roll.

9. In a sanding machine of the kind described, a suitable frame, a work-carrying table adjustably carried by said frame, a carriage mounted above said table, adjustable means for slidably carrying said carriage, and a sanding block carried by said carriage, and provided with an abrasive face.

10. In a sanding machine of the kind described, the combination of a suitable frame, a vertically adjustable work-carrying table, a carriage mounted above said frame, vertically adjustable means for slidably carrying said carriage, means for reciprocating the carriage, and a plurality of independent strips of abrasive material carried by said carriage, and each arranged with a portion of the strips in operative relation with the work carried by said table.

11. In a sanding machine of the kind described, and in combination, a suitable frame, a vertically adjustable table carried thereby, guides arranged at each side of said table between the ends of the frame and adjustably carried thereby, a carriage slidably mounted on said guides, means for reciprocating said carriage, a strip of abrasive material, means for carrying the ends of said strip, said strip extended below the carriage, in operative relation with the work carried by said table, and means for maintaining a portion of said strip in contact with the work to be sanded.

12. In a sanding machine of the kind described, and in combination, a suitable frame, a vertically adjustable table carried thereby, guides arranged at each side of said table between the ends of the frame and adjustably carried thereby, a carriage slidably mounted on said guides, means for reciprocating said carriage, a strip of abrasive material, means for carrying the ends of said strip, said strip extended below the carriage, in operative relation with the work carried by said table, means for maintaining a portion of said strip in contact with the work to be sanded, and means for moving the strip to vary the portion in contact with the work.

13. In a sanding machine of the kind described, and in combination, a suitable frame, a vertically adjustable table carried thereby, guides arranged at each side of said table between the ends of the frame and adjustably carried thereby, a carriage slidably mounted on said guides, means for reciprocating said carriage, a strip of abrasive material, means for carrying the ends of said strip, said strip extended below the carriage, in operative relation with the work carried by said table, and means for maintaining a portion of said strip in contact with the work to be sanded, comprising a sanding block consisting of a body part having a face plate carried thereby, and cushioning means arranged between the face plate and body, means for controlling said receiving rolls, whereby the paper is periodically drawn from the supply rolls to the receiving rolls, and advanced over the face plates in a series of steps, each shorter than the length of the face plate, said controlling means comprising a ratchet wheel, a coöperating actuating pawl, a plurality of pin wheels with pins projecting from the face thereof, means carried by said ratchet wheel for engaging said pins, and periodically moving the pin wheels, a pin of each pin wheel relatively longer than the others, and a star-shaped wheel for each receiving roll operatively connected with its respective receiving roll, said star-shaped wheels arranged to engage said long pins on said pin wheels, and means for preventing the backward rotation of said ratchet, pin and star wheels, means on said machine frame for engaging said actuating pawl, at one end of the travel of the carriage, and slightly advancing the same to move said ratchet wheel, yieldable means arranged at each end of the travel of said carriage for cushioning the same, means for maintaining the work to be sanded on said table, means for feeding the work through the machine, and means for guiding the work and preventing transverse movement thereof during its movement through the machine.

In testimony whereof, I have hereunto signed my name in the presence of two subscribing witnesses.

HERMAN E. MANOFSKY.

Witnesses:
WILLIAM A. KLATTE,
WILLIAM C. STAUDE.

Copies of this patent may be obtained for five cents each, by addressing the "Commissioner of Patents, Washington, D. C."